United States Patent
Tazawa et al.

(10) Patent No.: US 11,926,010 B2
(45) Date of Patent: Mar. 12, 2024

(54) PROCESSING APPARATUS AND PROCESSING METHOD

(71) Applicant: MITSUBISHI HEAVY INDUSTRIES COMPRESSOR CORPORATION, Tokyo (JP)

(72) Inventors: Yoshiki Tazawa, Hiroshima (JP); Masaki Shiwaki, Hiroshima (JP)

(73) Assignee: MITSUBISHI HEAVY INDUSTRIES COMPRESSOR CORPORATION, Tokyo (JP)

(*) Notice: Subject to any disclaimer, the term of this patent is extended or adjusted under 35 U.S.C. 154(b) by 20 days.

(21) Appl. No.: 17/820,104

(22) Filed: Aug. 16, 2022

(65) Prior Publication Data
US 2023/0056338 A1    Feb. 23, 2023

(30) Foreign Application Priority Data
Aug. 20, 2021  (JP) .................. 2021-134832

(51) Int. Cl.
| | | |
|---|---|---|
| *B23Q 11/00* | (2006.01) | |
| *B23C 9/00* | (2006.01) | |
| *B23Q 11/10* | (2006.01) | |
| *B24B 47/14* | (2006.01) | |

(52) U.S. Cl.
CPC ............... *B23Q 11/10* (2013.01); *B23C 9/00* (2013.01); *B24B 47/14* (2013.01)

(58) Field of Classification Search
CPC ..... B24B 47/14; B23Q 11/10; B23Q 11/1023; B23Q 5/06; B23C 9/00
See application file for complete search history.

(56) References Cited

U.S. PATENT DOCUMENTS

| | | | | | |
|---|---|---|---|---|---|
| 2,956,450 | A | * | 10/1960 | Yule | .................... F16H 61/0262 |
| | | | | | 192/58.4 |
| 3,708,240 | A | * | 1/1973 | Theis, Jr. | ................ B24B 47/18 |
| | | | | | 415/36 |
| 3,767,320 | A | * | 10/1973 | Theis, Jr. | ............... G05D 13/00 |
| | | | | | 415/36 |
| 4,485,595 | A | * | 12/1984 | Minamiyama | .......... B24B 41/04 |
| | | | | | 483/33 |

(Continued)

FOREIGN PATENT DOCUMENTS

| | | | | | |
|---|---|---|---|---|---|
| DE | 3819799 | A | * | 2/1989 | ............. B23B 31/02 |
| EP | 2623258 | A1 | | 8/2013 | |

(Continued)

*Primary Examiner* — Sara Addisu

(57) ABSTRACT

A processing apparatus includes: an apparatus main body including a base portion that is movable and a liquid supply unit that supplies a liquid to the base portion; a chuck portion connected to the base portion and including an attachment hole that is open outward; and a processing tool detachably mounted on the chuck portion. The processing tool includes a cylinder fitted into and held by the attachment hole, a drive unit disposed inside the cylinder and including a rotating body to be rotated around a central axis by the liquid introduced from the liquid supply unit via the base portion, a rotary shaft protruding outward from an inside of the cylinder along the central axis to rotate integrally with the rotating body, and a tool portion connected to a tip of the rotary shaft.

7 Claims, 5 Drawing Sheets

(56) References Cited

U.S. PATENT DOCUMENTS

| | | | | |
|---|---|---|---|---|
| 4,752,161 A * | 6/1988 | Hill | ............... | B23Q 5/06 |
| | | | | 408/127 |
| 8,747,033 B2 * | 6/2014 | Jenkins | ............ | B23Q 11/10 |
| | | | | 279/20 |
| 2012/0061924 A1 * | 3/2012 | Liebald | ............ | B23B 31/02 |
| | | | | 279/20 |
| 2013/0195576 A1 * | 8/2013 | Jaffe | ............ | B23Q 5/06 |
| | | | | 409/231 |
| 2020/0061766 A1 * | 2/2020 | Izumi | ............ | B23Q 11/10 |
| 2021/0031324 A1 * | 2/2021 | Bay | ............ | B23Q 17/22 |

FOREIGN PATENT DOCUMENTS

| | | |
|---|---|---|
| JP | 2007-190636 A | 8/2007 |
| JP | 2012-187677 A | 10/2012 |
| WO | 2014-138481 A2 | 9/2014 |
| WO | 2016-042539 A1 | 3/2016 |

\* cited by examiner

PROCESSING APPARATUS AND PROCESSING METHOD

BACKGROUND OF THE INVENTION

Field of the Invention

The present disclosure relates to a processing apparatus and a processing method.

Priority is claimed on Japanese Patent Application No. 2021-134832, filed on Aug. 20, 2021, the content of which is incorporated herein by reference.

Description of Related Art

Predetermined processing such as cutting or polishing is performed on a workpiece by a tool mounted on a tip portion of a spindle of a machine tool or of an arm of a robot. A tool used for processing is appropriately selected according to the type of the processing, the type of a workpiece, and the like. For example, Patent Document 1 discloses a configuration in which any tool (assembly tool) is detachably mounted on a spindle of a machine tool. In such a configuration, a tool selected according to the type of processing, the type of a workpiece, and the like can be mounted on the spindle.

[Patent Document 1] Japanese Unexamined Patent Application, First Publication No. 2012-187677

SUMMARY OF THE INVENTION

However, in a general machine tool as in the configuration described in Patent Document 1, a base end portion of the tool is held by the spindle in rotation. For this reason, a tip portion of the tool that comes into contact with the workpiece to perform processing is disposed at a position separated from the spindle in a direction of a central axis of the tool. In a case where a protrusion length of the tool from the spindle to the tip portion of the tool is large and processing is performed while rotating the tool together with the spindle around the central axis, vibration (runout) in a direction intersecting the direction of the central axis increases at the tip portion of the tool. The vibration increases as the distance between the spindle in rotation and the tip portion of the tool increases. For this reason, a ratio (L/D) of the protrusion length (L) of the tool to a diameter (D) of the tool needs to be suppressed to a certain level or less according to an allowable vibration magnitude.

As a result, for example, when a narrow processing location such as a narrow portion is located at a position away from the spindle, processing may be difficult to perform. In such a case, other processing methods such as electric discharge machining and laser machining may be used, but there is a possibility that the processing methods increase the cost or reduce the processing accuracy.

The present disclosure provides a processing apparatus and a processing method capable of stably performing processing even when a ratio of a protrusion length of a tool portion to a diameter of the tool portion is large.

According to an aspect of the present disclosure, a processing apparatus is provided including: an apparatus main body including a base portion that is movable and a liquid supply unit that is configured to supply a liquid to the base portion; a chuck portion connected to the base portion and including an attachment hole that is open outward; and a processing tool detachably mounted on the chuck portion. The processing tool includes a cylinder fitted into and held by the attachment hole, a drive unit disposed inside the cylinder and including a rotating body configured to rotate around a central axis by the liquid introduced from the liquid supply unit via the base portion, a rotary shaft protruding outward from an inside of the cylinder along the central axis and configured rotate integrally with the rotating body, and a tool portion connected to a tip of the rotary shaft.

According to another aspect of the present disclosure, a processing method is provided using the processing apparatus described above, the method including: a step of mounting the processing tool on the chuck portion; a step of supplying the liquid from the liquid supply unit to the drive unit and rotating the rotary shaft integrally with the rotating body; and a step of processing a workpiece be processed using the tool portion.

According to the processing apparatus and the processing method of the present disclosure, even when a ratio of a protrusion length of the tool portion to a diameter of the tool portion is large, processing can be stably performed.

DETAILED DESCRIPTION OF THE INVENTION

Hereinafter, a mode for implementing a processing apparatus and a processing method according to the present disclosure will be described with reference to the accompanying drawings. However, the present disclosure is not limited to this embodiment.

(Configuration of Processing Apparatus and Apparatus Main Body)

Figure 1:
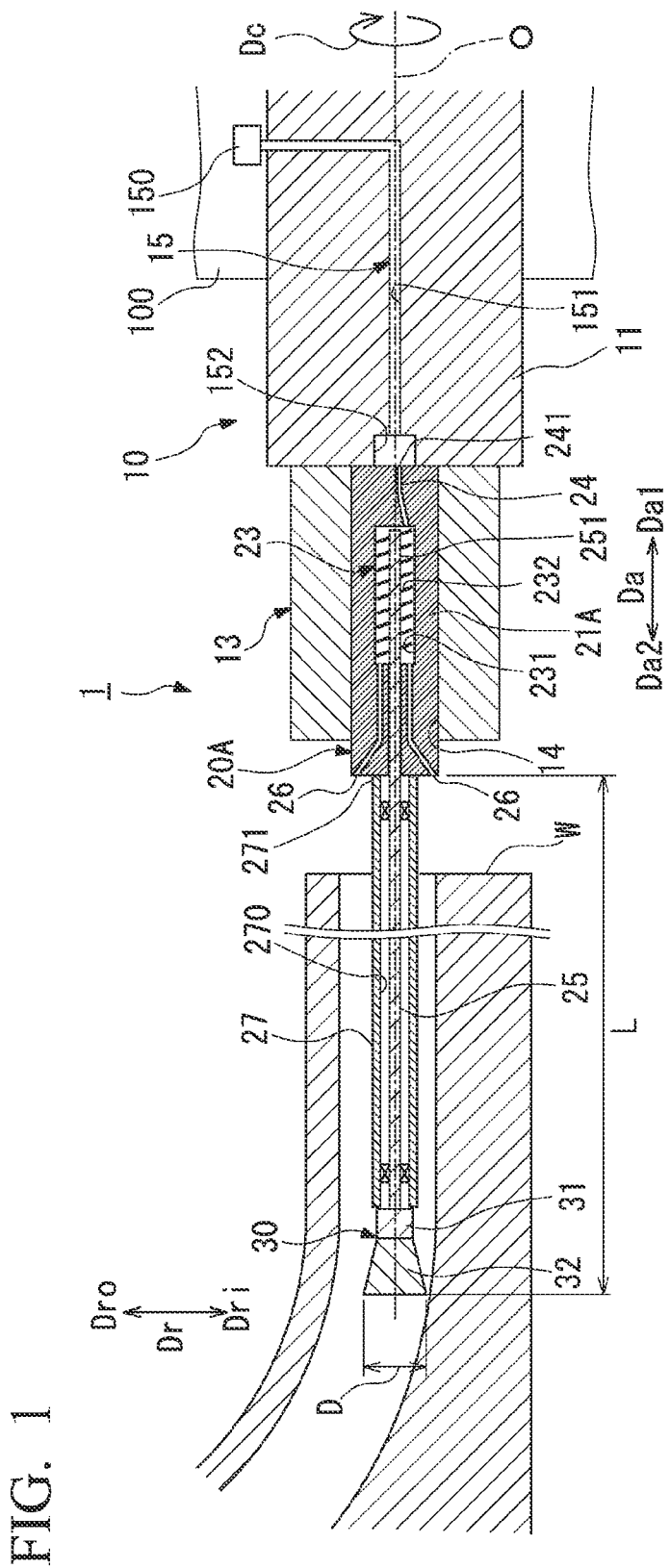
FIG. 1 is a cross-sectional view showing a schematic configuration of a processing apparatus according to the present embodiment.
Figure 2:
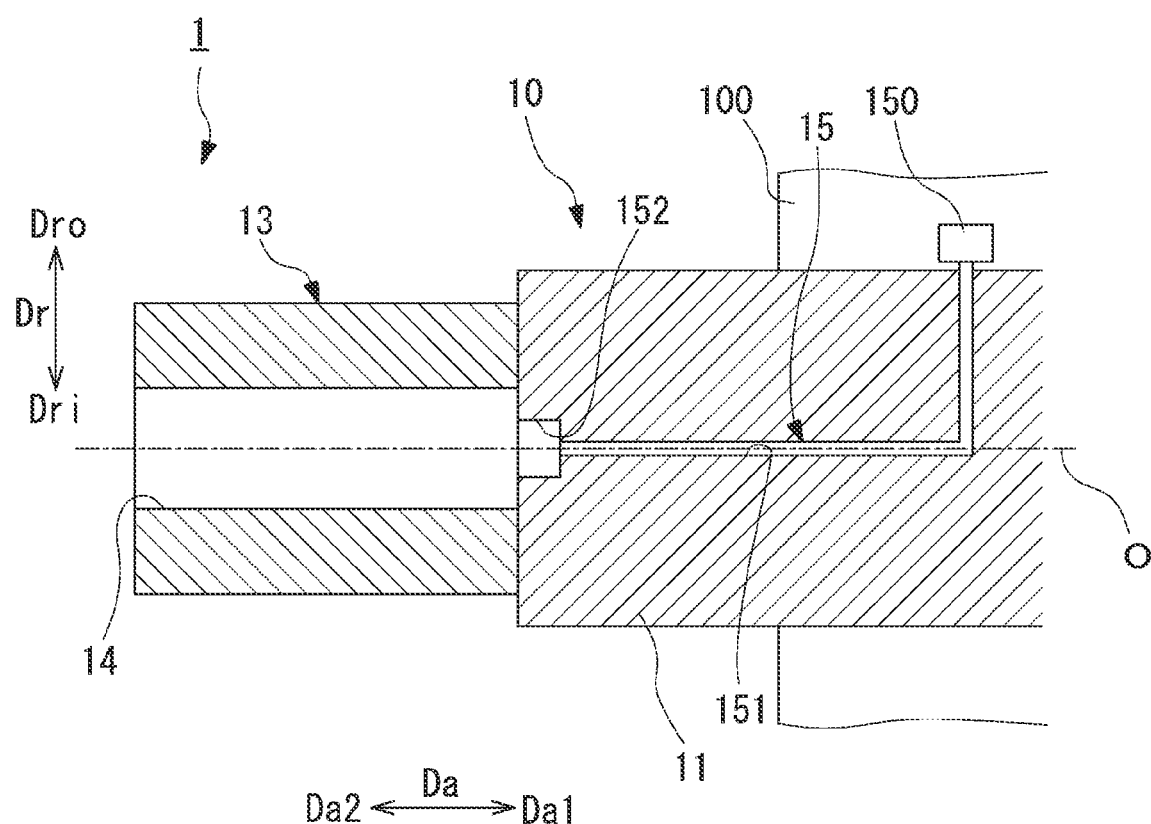
FIG. 2 is a cross-sectional view showing an apparatus main body forming the processing apparatus.

A processing apparatus 1 is an apparatus that processes a workpiece W to manufacture a processed product. The workpiece W in the present embodiment is, for example, an impeller. The processing apparatus 1 processes a flow path (impeller flow path) formed inside the impeller. Cutting, grinding, finishing (polishing), drilling, deburring, and the like are exemplary examples of processing of the workpiece W. As shown in FIG. 1, the processing apparatus 1 includes an apparatus main body 10, a chuck portion 13, and a processing tool 20A. In the present embodiment, the apparatus main body 10 is, for example, an NC machine tool that is a machine that performs cutting with a milling cutter or the like. The apparatus main body 10 may be a machining center that is an NC machine tool equipped with an automatic tool changer. As shown in FIGS. 1 and 2, the apparatus main body 10 includes a housing 100, a base portion 11, and a liquid supply unit 15.

The base portion 11 is a spindle of the apparatus main body 10 that is an NC machine tool. The base portion 11 is configured to be rotatable around a central axis O with respect to the housing 100 by a driving source (not shown) using electricity such as a motor. In addition, the base portion 11 is movable to any position with respect to the housing 100 fixed to an installation surface such as the ground.

The liquid supply unit 15 compresses a liquid introduced from the outside of the apparatus main body 10 and supplies the compressed liquid to the processing tool 20A. The liquid supply unit 15 of the present embodiment supplies a compressed lubricant to be supplied to the workpiece W during cutting, as the liquid. The lubricant may be water or oil. The liquid supply unit 15 includes a supply unit main body 150 that is a compression mechanism such as a pump (not shown). The supply unit main body 150 is a mechanism that pressure-feeds a liquid. The supply unit main body 150 is disposed inside a housing of the apparatus main body 10. The liquid supply unit 15 includes a flow path portion 151 formed to penetrate through the inside of the base portion 11. A liquid supply port 152 that is open to face the chuck portion 13 is formed at one end (first end) of the flow path portion 151. The other end (second end) of the flow path portion 151 is connected to the supply unit main body 150. The liquid supply unit 15 supplies the liquid supplied by the supply unit main body 150, from the liquid supply port 152 into an attachment hole 14 of the chuck portion 13 to be described later through the flow path portion 151.

(Configuration of Chuck Portion)

The chuck portion 13 is connected to the base portion 11. The chuck portion 13 may be detachably connected to the base portion 11. The chuck portion 13 may be non-detachably connected to the base portion 11 to be integrated therewith. The chuck portion 13 is formed in a cylindrical shape around the central axis O, which extends along the central axis O. The chuck portion 13 includes the attachment hole 14 that is open outward on a second side Da2 in an axial direction Da. A cylinder 21A of the processing tool 20A to be described later is inserted into the attachment hole 14. The chuck portion 13 includes an appropriate lock mechanism (not shown) that restrains the cylinder 21A from coming off from the attachment hole 14 in a state where the cylinder 21A is inserted into the attachment hole 14. In the chuck portion 13, the restraint of the cylinder 21A in the attachment hole 14 is released by releasing the lock mechanism, and the cylinder 21A can be removed from the attachment hole 14. The chuck portion 13 may be provided on the apparatus main body 10 itself in advance in order to attach a general cutting tool to the apparatus main body 10.

(Configuration of Processing Tool)

Figure 3:
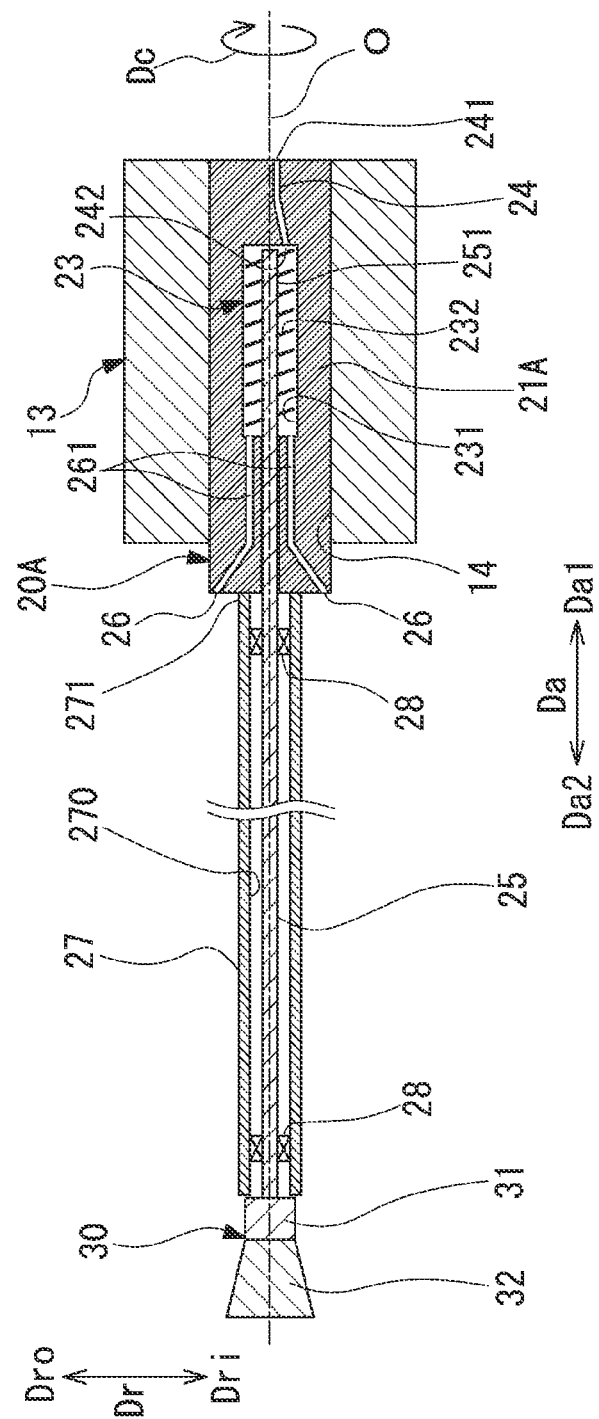
FIG. 3 is a cross-sectional view showing a processing tool forming the processing apparatus.

The processing tool 20A is detachably mounted on the chuck portion 13. The processing tool 20A is, for example, an air tool that is driven by compressed air instead of electricity as a power source, such as an air grinder or an air drill. The processing tool 20A of the present embodiment is an air tool that can be held with the hand and used by an operator. As shown in FIGS. 1 and 3, the processing tool 20A mainly includes the cylinder 21A, a drive unit 23, a rotary shaft 25, an outer cylinder 27, and a tool portion 30.

The cylinder 21A is formed in a cylindrical shape extending in the axial direction Da. The cylinder 21A has a slightly smaller outer diameter than an inner diameter of the attachment hole 14 and is shaped to be insertable into the attachment hole 14. The cylinder 21A is held by the attachment hole 14 (chuck portion 13) to be tightened from an outer side Dro (outer peripheral side) in a radial direction Dr in a state where the cylinder 21A is inserted into the attachment hole 14.

The drive unit 23 is disposed inside the cylinder 21A. The drive unit 23 rotates the rotary shaft 25 around the central axis O with respect to the cylinder 21A. The drive unit 23 of the present embodiment is disposed at a position overlapping the chuck portion 13 in the axial direction Da. The drive unit 23 includes a liquid chamber 231 and a rotating body 232.

The liquid chamber 231 is a columnar space extending in the axial direction Da inside the cylinder 21A. The liquid is introduced into the liquid chamber 231 from the supply unit main body 150 via the flow path portion 151 formed inside the base portion 11. Specifically, a liquid supply path 24 is formed inside the cylinder 21A. The liquid supply path 24 extends in the axial direction Da. Only one liquid supply path 24 is formed in the cylinder 21A. The liquid supply path 24 includes a liquid introduction port 241 that is open on an end surface on a first side Da1 of the cylinder 21A in the axial direction Da. The liquid introduction port 241 communicates with the liquid supply port 152 in a state where the cylinder 21A is held by the chuck portion 13. The liquid supply path 24 includes a liquid discharge port 242 that is open on an inner wall surface on the first side Da1 of the liquid chamber 231 in the axial direction Da. In particular, the liquid supply path 24 is a flow path connecting the liquid supply port 152 and the liquid chamber 231. The liquid is introduced into the liquid chamber 231 from the liquid supply unit 15 via the liquid supply path 24. Accordingly, the liquid supply path 24 supplies the liquid into the liquid chamber 231 from the liquid discharge port 242 so as to be ejected in a flow direction along the central axis O. In addition, a liquid discharge path 261 that discharges the liquid that has passed through the drive unit 23, to the outside is formed inside the cylinder 21A. A plurality of the liquid discharge paths 261 are formed in the cylinder 21A to surround a hole into which the rotary shaft 25 is inserted. Each of the plurality of liquid discharge paths 261 includes a discharge port 26 that is open on an end surface on the second side Da2 of the cylinder 21A in the axial direction Da. The discharge port 26 is open toward the outside of the processing tool 20A.

The rotating body 232 is disposed in the liquid chamber 231. The rotating body 232 is rotated around the central axis O in the liquid chamber 231 by the liquid introduced into the liquid chamber 231. The rotating body 232 of the present embodiment is, for example, a spiral plate member around the central axis O, which extends in the axial direction Da. The rotating body 232 is integrally connected to the rotary shaft 25 in the liquid chamber 231. When the liquid introduced into the liquid chamber 231 collides with the rotating body 232, the rotating body 232 is rotationally driven integrally with the rotary shaft 25 in a circumferential direction Dc around the central axis O.

The rotary shaft 25 is formed in a columnar shape extending in the axial direction Da. A first end portion 251 on the first side Da1 of the rotary shaft 25 in the axial direction Da is disposed in the liquid chamber 231 inside the cylinder 21A. A second end portion 252 on the second side Da2 of the rotary shaft 25 in the axial direction Da extends from the inside of the cylinder 21A in the axial direction Da to protrude outward. In particular, the second end portion 252 of the rotary shaft 25 which is close a tip is disposed outside the cylinder 21A. The rotary shaft 25 of the present embodiment is longer in the axial direction Da in a region where the rotary shaft 25 is disposed inside the cylinder 21A than in a region where the rotary shaft 25 is disposed outside the cylinder 21A.

The outer cylinder 27 is formed in a cylindrical shape extending in the axial direction Da. One end 271 on the first side Da1 of the outer cylinder 27 in the axial direction Da is integrally connected to the cylinder 21A. In particular, the outer cylinder 27 is non-rotatably connected to the cylinder 21A. The outer cylinder 27 extends to protrude from the cylinder 21A to the second side Da2 in the axial direction Da. The outer cylinder 27 of the present embodiment has a longer length in the axial direction Da than that of the cylinder 21A. The outer cylinder 27 includes an outer cylinder insertion hole 270 on an inner side Dri in the radial direction Dr, the rotary shaft 25 being rotatably inserted into the outer cylinder insertion hole 270. An inner diameter of the outer cylinder 27 is larger than an outer diameter of the rotary shaft 25. In particular, a gap is formed between an inner peripheral surface of the outer cylinder 27 and an outer peripheral surface of the rotary shaft 25. A bearing 28 is disposed between the inner peripheral surface of the outer cylinder 27 and the outer peripheral surface of the rotary shaft 25. A plurality (two in the present embodiment) of the bearings 28 are disposed at intervals in the axial direction Da. The plurality of bearings 28 support the rotary shaft 25 so as to be rotatable around the central axis O with respect to the outer cylinder 27.

The tool portion 30 is connected to the tip on the second side Da2 of the rotary shaft 25 in the axial direction Da. The tool portion 30 is a portion of the processing apparatus 1 that comes into contact with the workpiece W to perform processing. The tool portion 30 includes a tool attachment 31 and a tool blade portion 32. The tool attachment 31 is attachable to and detachable from the tip of the rotary shaft 25 (end on the second side Da2 of the rotary shaft 25 in the axial direction Da). The tool blade portion 32 is detachably mounted on the tool attachment 31. The tool blade portion 32 performs predetermined processing on the workpiece W. The tool blade portion 32 of the present embodiment is a commercially available cemented carbide cutter for an air grinder having various shapes.

In the present embodiment, a ratio L/D between an outer diameter D of the tool blade portion 32 and a tool protrusion length L is, for example, 1 to 30, and 20 or more can be adopted. The tool protrusion length L is a length of the tool portion 30 from the chuck portion 13 to a tip of the tool blade portion 32 in the axial direction Da.

(Procedure of Processing Method)

Figure 4:
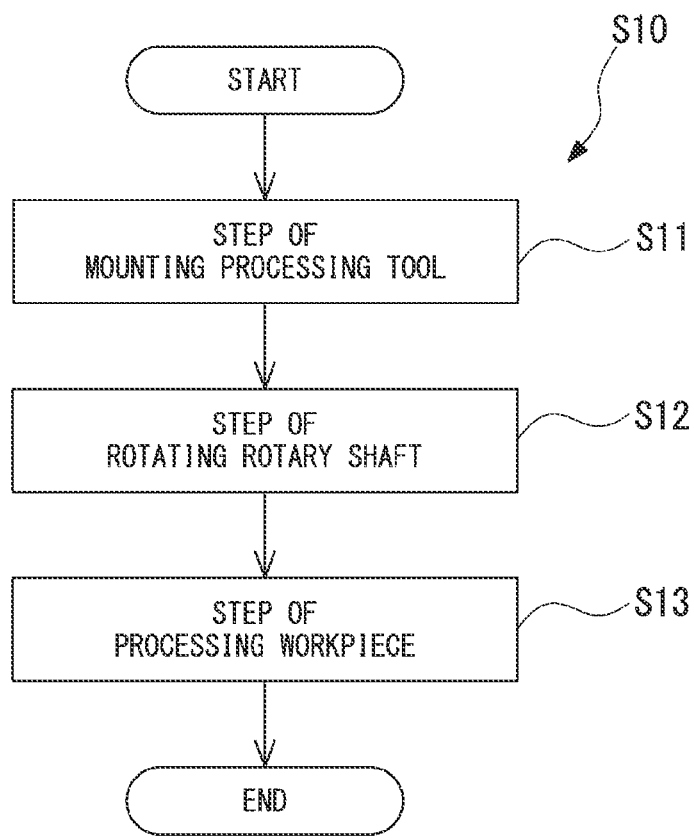
FIG. 4 is a flowchart showing a procedure of a processing method according to the present embodiment.

As shown in FIG. 4, a processing method S10 according to the present embodiment is a method for processing an impeller that is the workpiece W, using the processing apparatus 1. The processing method S10 of the present embodiment includes a step S11 of mounting the processing tool 20A, a step S12 of rotating the rotary shaft 25, and a step S13 of processing the workpiece W.

In the step S11 of mounting the processing tool 20A, the processing tool 20A is mounted on the apparatus main body 10 through the chuck portion 13. Specifically, the cylinder 21A is inserted into the attachment hole 14 of the chuck portion 13. In this state, the cylinder 21A is held from the outer side Dro (outer peripheral side) in the radial direction Dr by the chuck portion 13. Accordingly, the processing tool 20A is fixed to the apparatus main body 10 so as not to be able to come off. The liquid introduction port 241 communicates with the liquid supply port 152 in a state where the cylinder 21A is inserted into the attachment hole 14.

In the step S12 of rotating the rotary shaft 25, the liquid is supplied from the liquid supply unit 15 to the drive unit 23, and the rotary shaft 25 is rotated using the liquid. Specifically, the liquid pressure-fed from the supply unit main body 150 is supplied to the liquid supply port 152 through the flow path portion 151. The liquid is supplied from the liquid supply port 152 to the liquid supply path 24 via the liquid introduction port 241. The liquid that has flowed through the liquid supply path 24 is introduced into the liquid chamber 231 so as to be ejected from the liquid discharge port 242 in the flow direction along the central axis O. The rotating body 232 is pushed to rotate in the circumferential direction Dc around the central axis O by the liquid introduced into the liquid chamber 231. When the rotating body 232 is rotated by the liquid, the rotary shaft 25 is rotated integrally with the rotating body 232 at high speed in the circumferential direction Dc around the central axis O. Accordingly, the tool portion 30 connected to the tip of the rotary shaft 25 rotates together with the rotary shaft 25. In a state where the rotary shaft 25 is rotated by a flow of the liquid introduced into the liquid chamber 231, the base portion 11 (spindle) of the apparatus main body 10 is in a stationary state without rotation.

In the step S13 of processing the workpiece W, the tool blade portion 32 rotating in the circumferential direction Dc around the central axis O is pressed against the workpiece W to perform predetermined processing on the workpiece W. The workpiece W is movable relative to the tool blade portion 32. The workpiece W is processed into a predetermined shape by moving the workpiece W and the tool blade portion 32 relative to each other. In the present embodiment, in the step S13 of processing the workpiece W, for example, a flow path of the impeller as the workpiece W is polished.

(Effects)

In the processing apparatus 1 having the above configuration and the processing method S10, the processing tool 20A is mounted on the apparatus main body 10 through the chuck portion 13. The rotating body 232 of the drive unit 23 is rotated by the liquid supplied from the liquid supply unit 15, so that the rotary shaft 25 rotates around the central axis O. Accordingly, the tool portion 30 provided at a tip portion of the rotary shaft 25 can rotate and perform processing on the workpiece W. Since the liquid is used to drive the rotary shaft 25, the rotary shaft 25 can be rotationally driven at a higher pressure (hydraulic pressure) when compared to the case of using air. Therefore, processing can be performed on the workpiece W while applying a larger torque to the tool portion 30.

In addition, in the processing apparatus 1, the base portion 11 is not rotated, and the tool portion 30 is rotated together with the rotary shaft 25 by the drive unit 23 disposed inside the cylinder 21A. The tool portion 30 is disposed at a position further away from the chuck portion 13 with respect to the base portion 11, the cylinder 21A being mounted on the chuck portion 13. In particular, in the processing apparatus 1, a distance between the drive unit 23 that is a portion that rotates the tool portion 30 and the tool portion 30 in the axial direction Da is shorter than a distance between the base portion 11 and the tool portion 30 in the axial direction Da. For this reason, when compared to a case where the tool portion 30 is rotated by rotating the base portion 11, the protrusion length L that is a length from the rotated portion to the tip of the tool blade portion 32 in the axial direction Da can be suppressed to a smaller value. For this reason, even when the distance between the base portion 11 and the tip of the tool blade portion 32 is the same, the vibration of the tool portion 30 is further suppressed when compared to a case where the base portion 11 is rotated. As a result, even when the distance between the base portion 11 and the tip of the tool blade portion 32 is long, vibration can be suppressed, and processing can be stably performed.

In addition, the cylinder 21A is held from the outer peripheral side by the chuck portion 13 by being fitted into the attachment hole 14 of the chuck portion 13. Accordingly, the chuck portion 13 covers the cylinder 21A, and the cylinder 21A can be firmly held. Therefore, in a case where the liquid of high pressure is supplied to the liquid chamber 231 inside the cylinder 21A, even when the strength of the cylinder 21A itself is not improved, damage to the cylinder 21A can be suppressed.

In addition, the liquid supply path 24 that supplies the liquid to the liquid chamber 231 is formed in the cylinder 21A. The liquid is supplied to the liquid chamber 231 via the liquid discharge port 242 of the liquid supply path 24 so as to be ejected in the axial direction Da. Accordingly, the liquid can be supplied to the rotating body 232 in the flow direction along the central axis O. As a result, the rotating body 232 having a spiral shape can be efficiently pushed and rotated by a flow of the liquid in the axial direction Da.

In addition, the liquid supply path 24 is connected to the liquid supply port 152 formed at an end portion of the base portion 11, at the liquid introduction port 241 formed at an end portion of the cylinder 21A. Accordingly, when the cylinder 21A is connected to the chuck portion 13, the liquid supply path 24 and the flow path portion 151 communicate with each other. Accordingly, a supply path of the liquid to the drive unit 23 can be secured only by connecting the cylinder 21A to the chuck portion 13. Therefore, the processing tool 20A can be easily and rotatably mounted on the apparatus main body 10.

In addition, the liquid discharge path 261 that discharges the liquid that has passed through the drive unit 23, to the outside is formed in the cylinder 21A. Accordingly, the liquid sent into the liquid chamber 231 to rotate the rotary shaft 25 can be discharged to the outside of the cylinder 21A from the discharge port 26. As a result, the stagnation of the liquid in the liquid chamber 231 can be suppressed, and the rotating body 232 can be efficiently rotated by the liquid.

In addition, the rotary shaft 25 is inserted into the outer cylinder 27, so that the rotary shaft 25 in rotation is covered and reinforced by the outer cylinder 27 that is not in rotation. Therefore, even when the length of the rotary shaft 25 is long, the runout of the rotary shaft 25 can be suppressed. Accordingly, the vibration of the tool portion 30 is suppressed. As a result, even when the ratio of the protrusion length L of the tool portion 30 to the diameter D of the tool portion 30 is large, vibration can be suppressed, and processing can be more stably performed.

Further, the rotary shaft 25 inserted into the outer cylinder insertion hole 270 is supported to be rotatable with respect to the outer cylinder 27 via the bearings 28. As a result, the runout of the rotary shaft 25 inside the outer cylinder 27 can also be suppressed, and the vibration of the tool portion 30 can be further suppressed. As a result, even when the ratio of the protrusion length L of the tool portion 30 to the diameter D of the tool portion 30 is large such as L/D of more than 20, vibration can be further suppressed, and processing can be even more stably performed.

In addition, the liquid supply unit 15 supplies the lubricant to be supplied to the workpiece W during cutting, as the liquid. For this reason, the processing tool 20A can be driven using the lubricant furnished in the apparatus main body 10. Accordingly, there is no need to separately prepare a liquid for driving the processing tool 20A, and the processing tool 20A can be easily used through the apparatus main body 10.

In addition, according to the processing method S10 described above, the tool portion 30 can perform processing on the workpiece W in a state where the protrusion length L of the tool portion 30 protruding from the chuck portion 13 in a direction along the central axis O is suppressed. Therefore, vibration can be suppressed, and the impeller can be stably manufactured.

Modified Example of First Embodiment

In the first embodiment, the drive unit 23 is provided at an end portion on the first side Da1 of the processing tool 20A in the axial direction Da, but the position at which the drive unit 23 is disposed is not limited to such a position.

Figure 5:
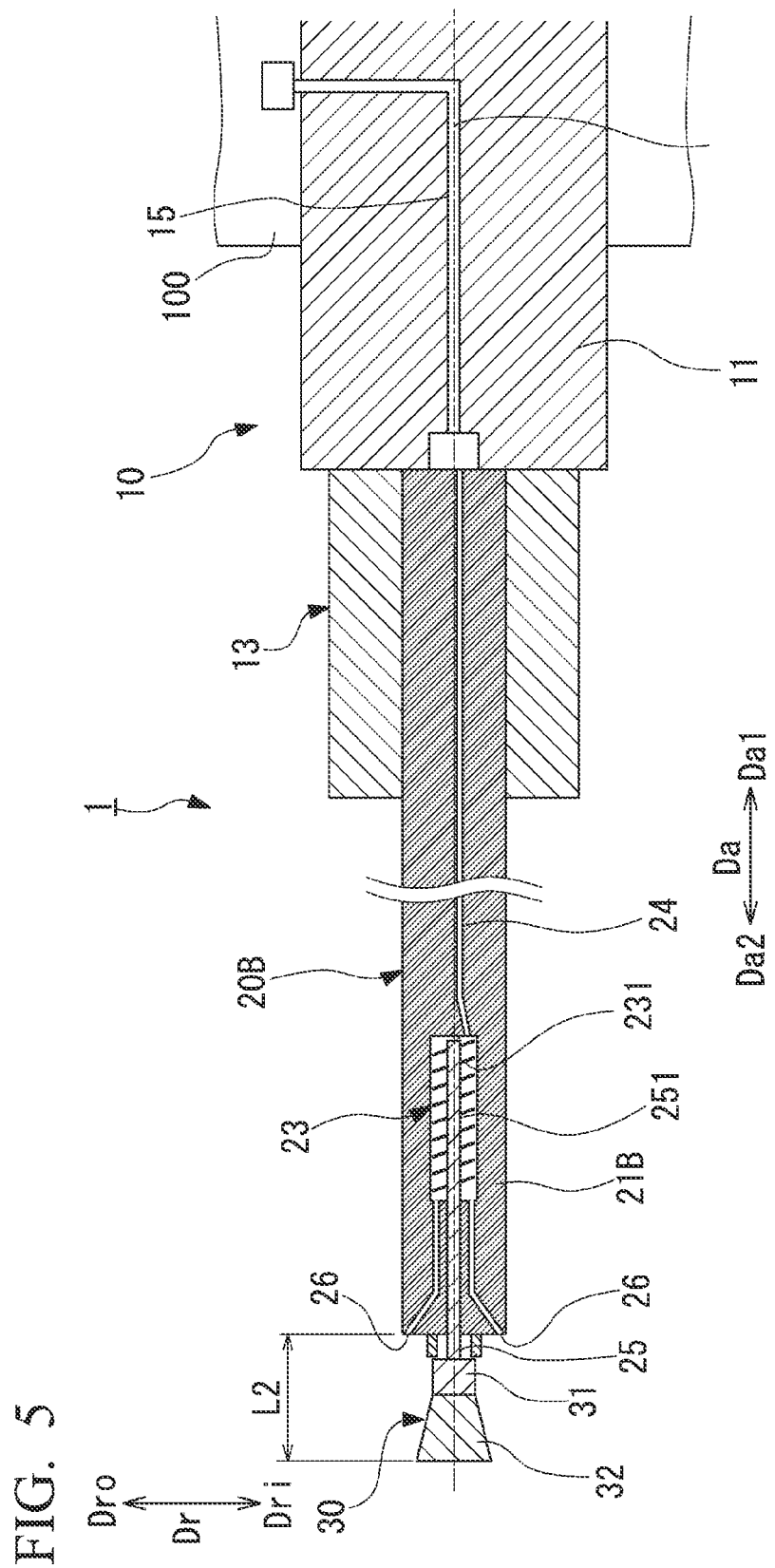
FIG. 5 is a cross-sectional view showing a schematic configuration of a processing apparatus according to a modification example of the present embodiment.

For example, as in a processing tool 20B shown in FIG. 5, a cylinder 21B held by the chuck portion 13 may be formed to protrude from the chuck portion 13 to the second side Da2 in the axial direction Da. At that time, the drive unit 23 may be disposed at an end portion on the second side Da2 of the cylinder 21B in the axial direction Da. In particular, the drive unit 23 is disposed at a position that does not overlap the chuck portion 13 in the axial direction Da.

With such a configuration, a tool protrusion length L2 of the tool portion 30 protruding from the cylinder 21B to the second side Da2 in the axial direction Da can be further shortened, and more stable processing can be performed.

OTHER EMBODIMENTS

The embodiment of the present disclosure has been described above in detail with reference to the drawings, but specific configurations are not limited to those of the embodiment, and design changes and the like within the concept of the present disclosure can also be included.

In the embodiment, the apparatus main body 10 is a machine tool but is not limited to such a configuration. For example, the apparatus main body 10 may be a multi-axis robot. In this case, the base portion 11 may be an arm of the multi-axis robot.

Further, in the embodiment, the liquid is discharged from the discharge port 26, but the discharged liquid may be supplied to a portion of the workpiece W processed by the tool blade portion 32 and used for cooling or lubrication.

In addition, in the embodiment, the rotating body 232 having a spiral shape is provided as the rotating body 232, but instead of this, can be changed to another appropriate configuration such as an impeller.

<Additional Notes>

The processing apparatus 1 described in the embodiment is identified, for example, as follows.

(1) A processing apparatus 1 according to a first aspect includes: an apparatus main body 10 including a base portion 11 that is movable and a liquid supply unit 15 that is configured to supply a liquid to the base portion 11; a chuck portion 13 connected to the base portion 11 and including an attachment hole 14 that is open outward; and a processing tool 20A or 20B detachably mounted on the chuck portion 13. The processing tool 20A or 20B includes a cylinder 21A or 21B fitted into and held by the attachment hole 14, a drive unit 23 disposed inside the cylinder 21A or 21B and including a rotating body 232 configured to rotate around a central axis O by the liquid introduced from the liquid supply unit 15 via the base portion 11, a rotary shaft 25 protruding outward from an inside of the cylinder 21A or 21B along the central axis O and configured to rotate integrally with the rotating body 232, and a tool portion 30 connected to a tip of the rotary shaft 25.

A lubricant (water) and a cutting oil (oil) are exemplary examples of the liquid.

Machine tools such as a milling cutter and a lathe and a robot are exemplary examples of the apparatus main body 10.

A spindle of a machine tool and an arm of a multi-axis robot are exemplary examples of the base portion 11.

In the processing apparatus 1, the tool portion 30 provided at a tip portion of the rotary shaft 25 can rotate and perform processing on a workpiece W. Since the liquid is used to drive the rotary shaft 25, the rotary shaft 25 can be rotationally driven at a higher pressure (hydraulic pressure) when compared to the case of using air. Therefore, processing can be performed on the workpiece W while applying a larger torque to the tool portion 30.

In addition, the tool portion 30 is disposed at a position further away from the chuck portion 13 with respect to the base portion 11, the cylinder 21A being mounted on the chuck portion 13. In particular, in the processing apparatus 1, a distance between the drive unit 23 that is a portion that rotates the tool portion 30 and the tool portion 30 in the axial direction Da is shorter than a distance between the base portion 11 and the tool portion 30 in the axial direction Da. For this reason, when compared to a case where the tool portion 30 is rotated by rotating the base portion 11, a protrusion length L that is a length from the rotated portion to the tool portion 30 in the axial direction Da can be suppressed to a smaller value. For this reason, even when a distance between the base portion 11 and the tool portion 30 is the same, the vibration of the tool portion 30 is further suppressed when compared to a case where the base portion 11 is rotated. As a result, even when the distance between the base portion 11 and the tool portion 30 is long, vibration can be suppressed, and processing can be stably performed.

Further, the cylinder 21A is held from an outer peripheral side by the chuck portion 13 by being fitted into the attachment hole 14 of the chuck portion 13. Accordingly, the chuck portion 13 covers the cylinder 21A, and the cylinder 21A can be firmly held. Therefore, in a case where the liquid of high pressure is supplied to the drive unit 23 inside the cylinder 21A, even when the strength of the cylinder 21A itself is not improved, damage to the cylinder 21A can be suppressed.

(2) According to the processing apparatus 1 of (1), in the processing apparatus 1 according to a second aspect, the cylinder 21A or 21B includes a liquid supply path 24 that is connected to the liquid supply unit 15 and configured to supply the liquid to the drive unit 23, and the liquid supply path 24 is configured to supply the liquid to the rotating body 232 in a flow direction along the central axis O.

Accordingly, the liquid can be supplied to the rotating body 232 in the flow direction along the central axis O. As a result, the rotating body 232 can be efficiently pushed and rotated by a flow of the liquid in the axial direction Da.

(3) According to the processing apparatus 1 of (1) or (2), in the processing apparatus 1 according to a third aspect, the cylinder 21A or 21B includes a liquid discharge path 261 that is configured to discharge the liquid that has passed through the drive unit 23, to an outside of the cylinder 21A or 21B.

Accordingly, the liquid sent to rotate the rotary shaft 25 can be discharged to the outside of the cylinder 21A from the liquid discharge path 261. As a result, the stagnation of the liquid in the cylinder 21A can be suppressed, and the rotating body 232 can be efficiently rotated by the liquid.

(4) According to the processing apparatus 1 of any one of (1) to (3), the processing apparatus 1 according to a fourth aspect further includes an outer cylinder 27 of which one end is connected to the cylinder 21A or 21B, which extends along the central axis O, and which includes an outer cylinder insertion hole 270 into which the rotary shaft 25 is inserted. The outer cylinder 27 is non-rotatably connected to the cylinder 21A or 21B.

Accordingly, the rotary shaft 25 is inserted into the outer cylinder 27, so that the rotary shaft 25 in rotation is covered and reinforced by the outer cylinder 27 that is not in rotation. Therefore, even when the length of the rotary shaft 25 is long, the runout of the rotary shaft 25 can be suppressed. Accordingly, the vibration of the tool portion 30 can be suppressed, and processing can be more stably performed.

(5) According to the processing apparatus 1 of (4), the processing apparatus 1 according to a fifth aspect further includes a bearing 28 disposed between an inner peripheral surface of the outer cylinder 27 and an outer peripheral surface of the rotary shaft 25 to support the rotary shaft 25 so as to be rotatable around the central axis O with respect to the cylinder 21A or 21B.

Accordingly, the runout of the rotary shaft 25 inside the outer cylinder 27 can also be suppressed, and the vibration of the tool portion 30 can be further suppressed. As a result, the vibration of the tool portion 30 can be further suppressed, and processing can be even more stably performed.

(6) According to the processing apparatus 1 of any one of (1) to (5), in the processing apparatus 1 according to a sixth aspect, the apparatus main body 10 is a machine that is configured to perform cutting, and the liquid supply unit 15 is configured to supply a compressed lubricant to be supplied to a workpiece during the cutting, as the liquid.

Accordingly, the processing tool 20A can be driven using the lubricant. Accordingly, there is no need to separately prepare a liquid for driving the processing tool 20A, and the processing tool 20A can be easily used through the apparatus main body 10.

(7) A processing method S10 according to a seventh aspect using the processing apparatus 1 of any one of (1) to (6) includes: a step S11 of mounting the processing tool 20A or 20B on the chuck portion 13; a step S12 of supplying the liquid from the liquid supply unit 15 to the drive unit 23 and rotating the rotary shaft 25 integrally with the rotating body 232; and a step S13 of processing a workpiece W using the tool portion 30.

Accordingly, since the processing apparatus 1 is used, processing can be performed on the workpiece W while applying a larger torque to the tool portion 30. Further, even when the distance between the base portion 11 and the tool portion 30 is long, vibration can be suppressed, and processing can be stably performed. In addition, in a case where the liquid of high pressure is supplied to the drive unit 23 inside the cylinder 21A, even when the strength of the cylinder 21A itself is not improved, damage to the cylinder 21A can be suppressed.

(8) According to the processing method S10 of (7), in the processing method S10 according to an eighth aspect, in the step of processing the workpiece W, an impeller is manufactured as the workpiece W.

Accordingly, in the manufacturing of the impeller, even when a ratio of a protrusion length L of the tool portion 30 to a diameter D of the tool portion 30 is large, processing can be stably performed.

EXPLANATION OF REFERENCES

1: Processing apparatus
10: Apparatus main body
100: Housing
11: Base portion
13: Chuck portion
14: Attachment hole
15: Liquid supply unit 150: Supply unit main body
151: Flow path portion
152: Liquid supply port
20A, 20B: Processing tool
21A, 21B: Cylinder
22: Connection portion
23: Drive unit
231: Liquid chamber
232: Rotating body
24: Liquid supply path
241: Liquid introduction port
242: Liquid discharge port
25: Rotary shaft
251: First end portion
252: Second end portion
26: Discharge port
261: Liquid discharge path
27: Outer cylinder
270: Outer cylinder insertion hole
271: One end
28: Bearing
30: Tool portion
31: Tool attachment
32: Tool blade portion
D: Diameter
L: Protrusion length of tool portion
Da: Axial direction
Da1: First side
Da2: Second side
Dc: Circumferential direction
Dr: Radial direction
Dri: Inner side
Dro: Outer side
O: Central axis
S10: Processing method
S11: Step of mounting processing tool
S12: Step of rotating rotary shaft
S13: Step of processing workpiece
W: Workpiece

What is claimed is:

1. A processing apparatus comprising:
an apparatus main body comprising:
  a base portion that is:
    a movable spindle of a numerical control (NC) machine tool, or
    a movable arm of a multi-axis robot; and
  a liquid supply unit that is configured to supply a liquid to the base portion;
a chuck portion connected to the base portion and including an attachment hole that is open outward;
a processing tool detachably mounted on the chuck portion and that comprises:
  a cylinder fitted into and held by the attachment hole;
  a drive unit disposed inside the cylinder and comprising
    a rotating body configured to rotate around a central axis by the liquid introduced from the liquid supply unit via the base portion;
  a rotary shaft protruding outward from an inside of the cylinder along the central axis and configured to rotate integrally with the rotating body; and
  a tool portion connected to a tip of the rotary shaft; and
an outer cylinder:
  of which one end is non-rotatably connected to the cylinder,
  that extends along the central axis, and
  that includes an outer cylinder insertion hole into which the rotary shaft is inserted.

2. The processing apparatus according to claim 1, wherein
the cylinder includes a liquid supply path that is connected to the liquid supply unit and configured to supply the liquid to the drive unit, and
the liquid supply path is configured to supply the liquid to the rotating body in a flow direction along the central axis.

3. The processing apparatus according to claim 1, wherein the cylinder includes a liquid discharge path that is configured to discharge the liquid that has passed through the drive unit, to an outside of the cylinder.

4. The processing apparatus according to claim 1, further comprising a bearing disposed between an inner peripheral surface of the outer cylinder and an outer peripheral surface of the rotary shaft to support the rotary shaft so as to be rotatable around the central axis with respect to the cylinder.

5. The processing apparatus according to claim 1, wherein
the apparatus main body is a machine that is configured to perform cutting, and
the liquid supply unit is configured to supply a compressed lubricant to be supplied to a workpiece during the cutting, as the liquid.

6. A processing method using the processing apparatus according to claim 1, the method comprising:
a step of mounting the processing tool on the chuck portion;
a step of supplying the liquid from the liquid supply unit to the drive unit and rotating the rotary shaft integrally with the rotating body; and
a step of processing a workpiece using the tool portion.

7. The processing method according to claim 6, wherein in the step of processing the workpiece, an impeller is manufactured as the workpiece.

* * * * *